Jan. 27, 1959  H. W. ROCKWELL  2,870,655
CHANGE SPEED TRANSMISSION
Filed Feb. 20, 1957  2 Sheets-Sheet 1

Inventor
Harvey W. Rockwell
By Charles L. Schwab
Attorney

Jan. 27, 1959  H. W. ROCKWELL  2,870,655
CHANGE SPEED TRANSMISSION
Filed Feb. 20, 1957  2 Sheets-Sheet 2

Inventor
Harvey W. Rockwell
By Charles L. Schmal
Attorney

United States Patent Office 2,870,655
Patented Jan. 27, 1959

2,870,655

CHANGE SPEED TRANSMISSION

Harvey W. Rockwell, Cedar Rapids, Iowa, assignor to Allis-Chalmers Manufacturing Company, Milwaukee, Wis.

Application February 20, 1957, Serial No. 641,383

15 Claims. (Cl. 74—785)

This invention relates to change speed transmissions and particularly to a change speed transmission employing friction contact plates to effect a shift to a different speed ratio.

It is desirable in many applications where power is transmitted through a shaft to provide a way of changing speed ratios without having to unclutch the power source and shift gears. For example, such a change speed transmission may be desired in tractors drawing heavy loads where it can be used in combination with a standard clutch and torque converter or it may be desirable to use the unit in an electric motor drive involving a series wound motor to prevent the motor from running away during a shifting operation.

Some two speed planetary transmissions have a spring loaded clutch which normally maintains engagement between an input and an output shaft for direct drive. In such applications it is also desirable that the shift to a different speed ratio be effected quickly and smoothly. To achieve this result a hydraulically actuated brake may be used to effect the speed ratio change between the input and output shafts. When such a brake is being engaged, it is necessary that the spring loaded clutch locking the gears in a condition of direct drive be automatically disengaged. It is, therefore, desirable that there be a positive and direct means of simultaneously and progressively disengaging the spring loaded clutch as the brake is being engaged.

It is necessary that the disengaging of the clutch and the engaging of the brake occur simultaneously and progressively to avoid the jerky transmission of power that would result if the clutch were suddenly released and the brake applied. A progressive transition from one speed ratio to another not only makes for smooth operation but also eliminates objectionable stresses that would be imposed upon the moving parts of the transmission should the engaging and disengaging of the friction plates take place suddenly.

Inasmuch as the friction plates used in the clutch and braking means are subject to wear in the course of usage, it is highly desirable that the wear occurring during the normal useful life of the transmission be automatically compensated for in order to eliminate the necessity for periodically renewing the friction plates.

As the wear on the friction plates is being compensated for, it should not be necessary that there be any additional travel required of the engaging mechanism that may result in increasing the time necessary to lock the plates in frictional engagement with each other. In other words, it is desirable that the time interval required to engage and disengage the friction plates be approximately constant as wear occurs during usage in order that a quick transition from one speed ratio to another can be effected during the entire useful life of the transmission.

From a manufacturing and a maintenance standpoint it is also desirable that the friction plates used in the clutch and the brakes be interchangeable. In many applications where the radial space limitations are critical, it is desirable that the clutch, springs and brake be so constructed and arranged with reference to the planetary gear set that the friction plates can be located at a minimum radial distance from the axis of the shaft and not unduly increase the radial displacement of the transmission unit as a whole.

Generally, it is an object of this invention to provide a quick shifting, two speed transmission for use as a single transmission unit or in combination with other transmission units.

A further object of this invention is to provide an improved planetary type transmission in which a spring loaded clutch normally maintains engagement between an input shaft and an output shaft for a unitary speed ratio.

A more specific object of this invention is to provide a speed changing mechanism for a planetary gear set that automatically compensates for wear of the friction plates and positions the friction plates as wear occurs in service in order that the piston travel required to lock the plates in frictional engagement will be approximately constant and thereby the same approximate period of time for shifting to a reduced speed ratio will result throughout the service life of the transmission.

It is another object to provide a planetary gear transmission in which the gears are always in mesh and the gear ratios may be changed without disengaging gears and the meshing of other gears.

It is a further object of this invention to provide a planetary gear transmission which is normally transmitting power at a speed ratio of 1 and does not require any fluid pressure to keep the gear train engaged in a direct drive condition.

A still further object of this invention is to provide a change speed planetary transmission which is radially compact and effectively supported about the input and output shafts.

It is still another object of this invention to provide a two speed planetary transmission having a clutching and braking means in which friction plates are axially aligned with each other, compression springs are used to load the clutch means, and an annular piston is used to compress the braking friction plates.

Other objects and advantages of this invention are made apparent in the following specification by reference to the accompanying drawings wherein.

Figure 1:
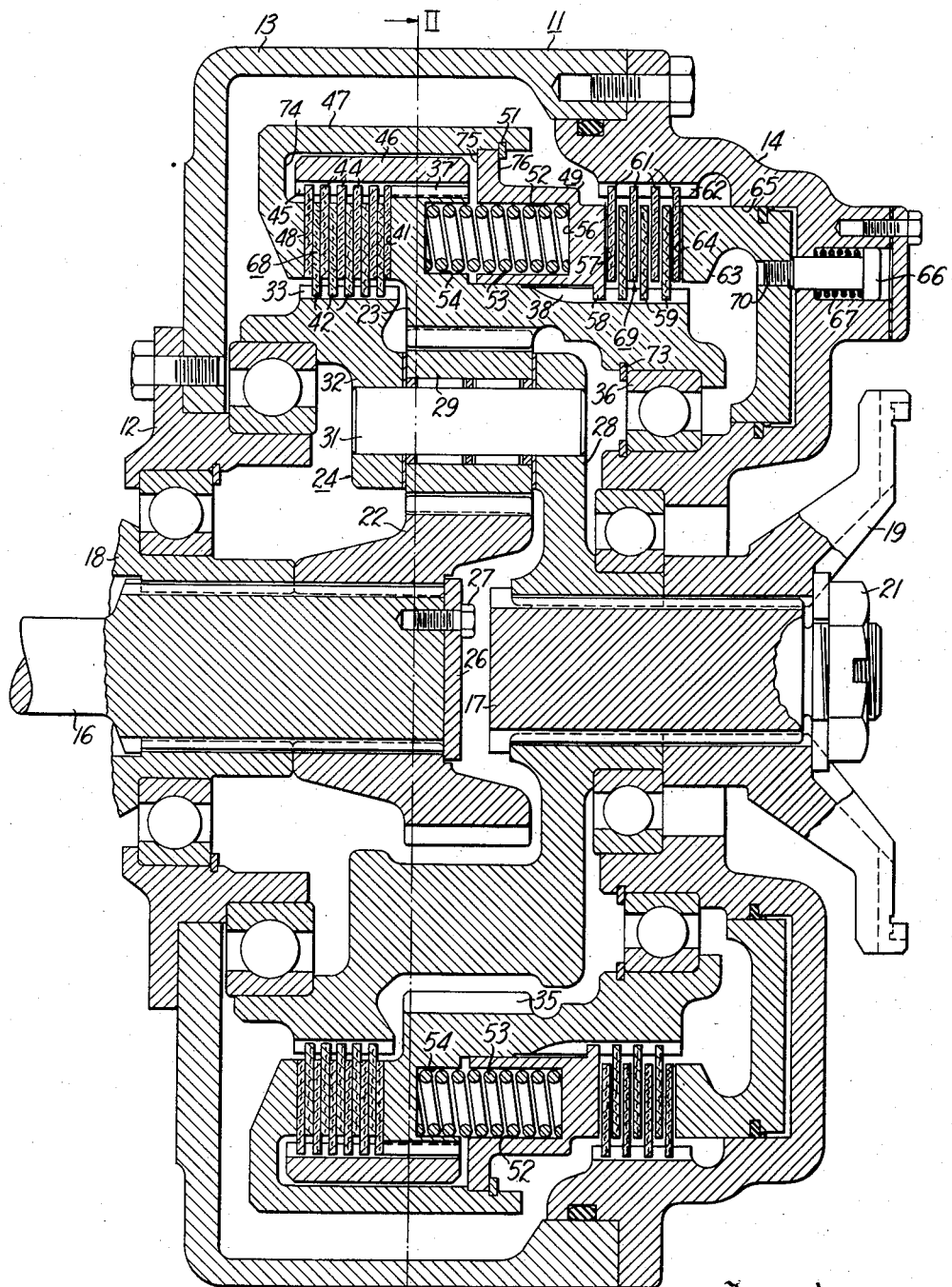
Fig. 1 is a longitudinal cross sectional view through a transmission unit embodying the present invention.

Referring to Fig. 1, a planetary gear set is contained in a housing 11. The housing 11 is constructed of three separate parts, a bearing support flange 12, a cylindrical body 13, and an annular cylinder end portion 14, which are concentrically arranged about an input shaft 16 and an output shaft 17. The input shaft 16 is splined to a hub 18 in the support flange 12. The support flange 12 is rigidly connected to the cylindrical body 13 by a plurality of cap screws. The annular cylinder end portion 14 is attached to the cylindrical body 13 by a plurality of cap screws and is concentrically arranged about the output shaft 17. A coupling flange 19 is splined to the output shaft 17 and secured against axial separation by the lock nut 21.

The planetary gear set includes a sun gear 22, a ring gear 23 and a planet carrier 24. The sun gear 22 is splined to the input shaft 16 and prevented from axial separation by a retaining plate 26 secured to the shaft 16 by lock screws 27. The planet carrier 24 has a spider 28 carrying three planet pinions 29. The planet pinions 29 are rotatably supported by the stub shafts 31 which are supported at one end by the spider 28 and at the other end by an axially extending portion 32 which is rotatably supported by the support flange 12 and which presents an externally splined surface 33. The ring gear 23 has internal gear teeth 35 meshing with the planet pinions 29 and is rotatably connected to the annular cylinder portion 14 of the housing 11 by the bearings 36. The periphery of the ring gear 23 is provided with two splined sections 37, 38 and is formed with vertical annular surface 41.

A first series of annular friction plates 42 having internal gear toothed splines engage the splined section 33 on the planetary carrier 24. A second series of annular friction plates 44 having external gear toothed splines are interleaved between the first series 42 and are connected to the ring gear 23 by a collar 46. Collar 46 has internal splines 45 which engage the splined section 37 of the ring gear 23 and the external splines of the second series of friction plates 44. A pressure plate 47 presenting a vertical annular surface 48 normally holds the first and second series of plates 42, 44 in frictional engagement with each other to lock the planet carrier 24 integral in rotation with the ring gear 23.

The pressure plate 47 is rigidly secured to a reactor ring 49 by a snap ring 51 and can be considered as an integral part of the reactor ring 49. The vertical portion of the reactor ring 49 and the connecting portion of the pressure plate 47 are so constructed and arranged as to form a housing around the collar 46 in order to prevent the collar 46 from sliding off the splines on the ring gear 23 and to prevent the annular friction plates 44 from sliding off the internal splines of the collar 46. The housing also serves to axially position the splined collar 46 with reference to the first and second series of plates 42 and 44 as these plates undergo wear in the course of their normal usage.

The reactor ring 49 is so formed as to provide suitable receiving cages 52 for a series of equally spaced coil springs 53 held captive between a recessed portion 54 presented by the ring gear 23 and a vertical surface 56 within the interior of the cages 52 provided by the form of the reactor ring 49. The coil springs 53 are installed under compression when the transmission unit is assembled. The compressive force of the springs 53 normally urges the annular surface 48 of the pressure plate 47 against the first and second series of plates 42 and 44, and is sufficient to hold these plates in frictional engagement with each other. As shown in Fig. 1, the right end portion of the reactor ring 49 presents a vertical annular reaction surface 57 and has internal splines 58 which engage the splined section 38 on the external periphery of the ring gear 23.

A third series of annular friction plates 59 are slidably and nonrotatably mounted on the splined section 38 of the ring gear 23. The fourth series of annular friction plates 61 are interleaved between the third series 59 and have external splines which engage the splines 62 formed on the inside periphery of the cylindrical end portion 14 of the housing 11. When the third and fourth series of plates 59 and 61 are in frictional engagement with each other, the ring gear 23 is locked integrally with the housing 11 and the planet carrier 24 and pinions 29 must rotate about the sun gear 22.

An annular piston 63 is slidably disposed in an annular cylinder 65 formed in the cylinder end portion 14 and has a vertical annular surface 64 axially aligned with the series of interleaved plates 59 and 61. When fluid pressure is admitted to the annular cylinder 65 the piston 63 will move axially and urge the third and fourth series of friction plates 59, 61 against the vertical annular reaction surface 57 on the reactor ring 49. The axial movement of the reactor ring 49 is resisted by the coil springs 53 which are under compression. During the initial movement of the reactor ring 49 the vertical annular pressure surface 48 of the pressure plate 47 is moved to the left progressively releasing the pressure between the first and second series of plates 42, 44 and thereby disengaging these plates from frictional engagement with each other. It should be noted that as the third and fourth series of friction plates 59, 61 are being progressively engaged, the first and second series of plates 42, 44 are simultaneously and progressively disengaged from frictional contact with each other.

When the pressure is "off" in the cylinder 65, the piston 63 is returned to its initial starting position by three spring actuated plungers 66. The plungers 66 are housed in the cylinder end portion 14. Suitable coil springs 67 are concentrically mounted around the plunger 66 and one end of the springs 67 abuts against a shoulder formed in the cylinder 65 and the other end against an annular shoulder on the plunger 66 which has a threaded portion 70 connected to the piston 63. As the piston 63 moves under pressure to the left, the plunger 66 is caused to move axially and the shoulder on the plunger 66 compresses the springs 67. When the pressure in the cylinder 65 is relieved, the springs 67 return the piston 63 to its initial position.

From the description so far, it will be seen that the first and second series of plates 42, 44 cooperating with the pressure plate 47, the reactor ring 49 and compression springs 53 function as a spring loaded clutch 68. The purpose of this spring loaded clutch 68 is to lock the planet carrier 24 and the ring gear 23 together so that the sun gear 22, planet carrier 24 and ring gear 23 are integral in rotation with each other. Thus, the entire planetary gear set rotates as a unit. In this condition of operation the input shaft 16 is directly coupled to the output shaft 17 for a speed ratio of 1.

It will be readily seen that the third and fourth series of friction plates 59, 61 serve as a part of a pressure actuated brake 69. The function of the brake 69 is to lock the ring gear 23 to the housing 11 and render it stationary.

The action of the brake 69 is mechanically tied in with the spring loaded clutch 68 by the reactor ring 49 and the pressure plate 47 so that when the brake 69 is being actuated, the spring loaded clutch 68 is being released. When the spring loaded clutch 68 is fully released, the planet carrier 24 is free to rotate about the sun gear 22 and power can be transmitted from the input shaft 16 to the output shaft 17 at a predetermined speed ratio. It should be noted that the same thrust force that is being exerted against the friction plates 59, 61 of the brake 69 is also utilized to relieve the friction plates 42, 44 of the pressure holding these plates in frictional contact. This simultaneous application of pressure to the brake and relieving of the pressure in the clutch 68 results in a virtually imperceptible transition from direct drive to a predetermined reduced speed drive.

Figure 2:
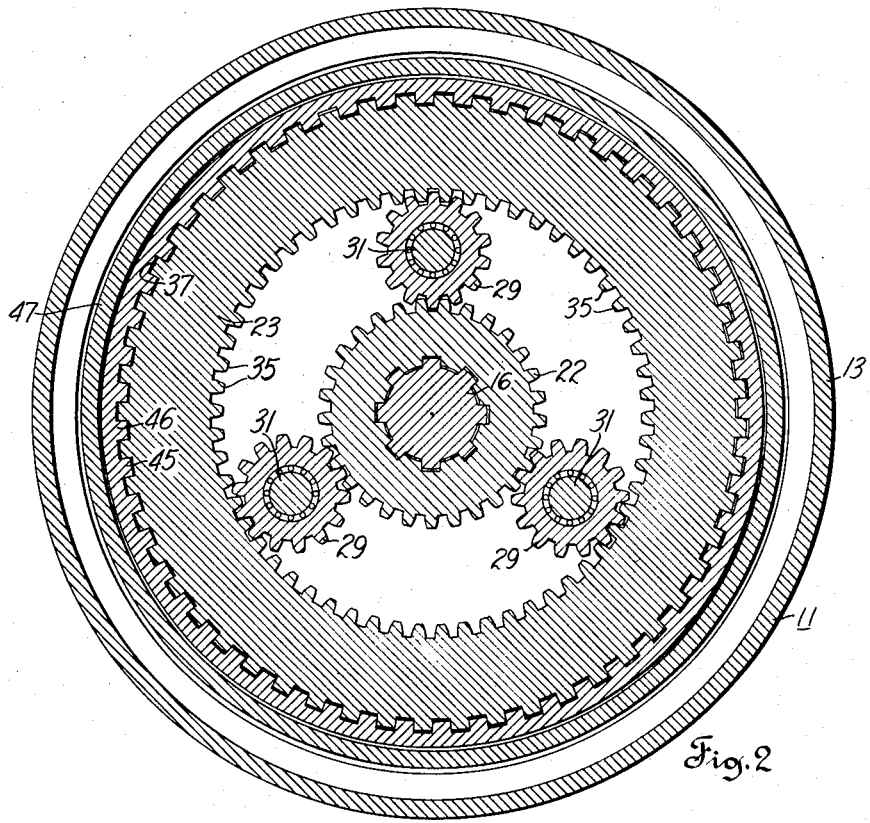
Fig. 2 is a transverse cross sectional view taken substantially on the plane indicated by the line II—II of Fig. 1.

Referring to Fig. 2 three planet pinions 29 are shown meshing with the sun gear 22 and the ring gear 23. A planetary gear set employing more than three planet pinions 29 can be used depending upon the torque requirements of a particular application. Although the planetary transmission hereinbefore described is primarily a speed reduction or torque multiplication unit, it is readily apparent that by reversing the input and output shafts 16, 17 the mechanism can be used as an overdrive device.

The ring gear 23, as shown in Fig. 1, is provided with recesses 54 in circumferentially spaced relation for reception of the coiled compression springs 53. In view of the fact that the ring gear 23 is rotatably supported by the ball bearings 36, any compressive force exerted by the springs 53 necessarily tends to urge the reactor ring 49 to the right as wear occurs on the clutch friction plates 42, 44 and the brake friction plates 59, 61, and the annular reaction surface 57 on the reactor ring 49 progressively assumes a position to the right. Therefore, the travel of the annular piston 63 required to engage the brake friction plates 59, 61 into locking engagement will remain approximately constant even after extensive periods of usage. This feature eliminates the objectionable lag in response that would occur if the period of travel of the piston were increased.

Figure 3:
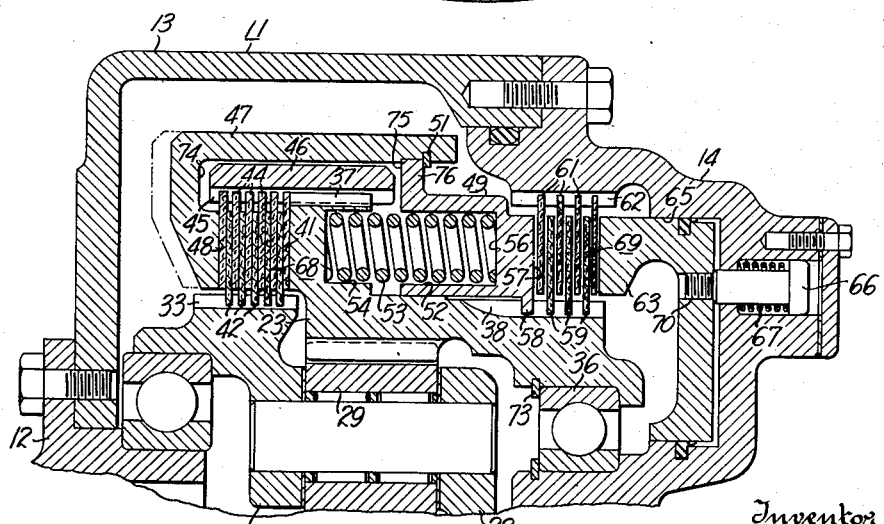
Fig. 3 is a fragmentary view of the upper portion of the transmission unit shown in Fig. 1.

Fig. 3 shows the position of the pressure plate 47 and reactor ring 49 when the plates 42, 44, 59, 61 are worn. The position of pressure plate 47 when no wear has taken place is shown by the phantom outline at the left end of the pressure plate 47. It should be noted that the thickness of the interleaved clutch plates 42, 44 determines the axial position of the annular pressure surface 57 on the reactor ring 49 inasmuch as the frictional areas of the clutch plates 42, 44 and the brake plates 59, 61 are approximately the same and the simultaneous engaging and disengaging action of the mechanism equalizes the wear on the plates. It is readily apparent that the unit can be designed so that the annular reaction surface 57 on the reactor ring 49 can be suitably positioned on the external periphery of the ring gear 23 for a predetermined amount of wear of the friction plates. This feature makes it possible to operate the unit over extensive periods of time without necessity for disassembling the unit and renewing friction plates because of wear.

The compression springs 53 are horizontally disposed in the recess 54 provided by the ring gear 23 and the cage 52 formed in the reactor ring 49. When the transmission unit is assembled the springs 53 are placed under compression so that the clutching plates 42, 44 are normally engaged. The springs 53 also function to yieldingly oppose any movement of the brake plates in order to allow a progressive braking and unclutching operation. Arranging the springs 53 horizontally permits the effective spring force and the thrust exerted by the piston 63 to have the same longitudinal line of action. This eliminates objectionable bending or stressing of parts in the transmission unit.

The floating collar 46 splined to the outer periphery of the ring gear 23 connects the second series of annular friction plates 44 nonrotatably to the ring gear 23. The inner vertical walls 74, 75 of the housing formed by the pressure plate 47 and the vertical flanged portion 76 of the reactor ring 49 restrict the axial movement of the collar 46 as the pressure plate 47 and the reactor ring 49 moves in an axial direction. The inner walls 74, 75 serve to maintain the axial position of the collar 46 with reference to the clutching plates 44.

The transmison unit which is the subject of this invention may be used separately or may be embodied in a larger transmission system. In Fig. 1 the input shaft 16 is extended through and is splined to a hub 18. The hub 18 has external splines engaging the sliding gear of a reversing gear mechanism which is not shown. If desired, a number of transmission units may be stacked in series longitudinally along a shaft to obtain additional speed ratios.

In normal operation the pressure is "off" in the cylinder 14 and the planet carrier 24 and the ring gear 23 are positively locked against rotation. The entire planetary gear set then rotates with the input shaft 16 to provide a speed ratio of 1. Since the clutching plates 42, 44 are normally engaged by the action of the compression springs 53, it is not necessary to employ any pressure actuating means during the starting of the drive unit since the input and output shafts 16, 17 are directly coupled. When it is desired to change the speed ratio, fluid pressure is supplied to the cylinder 65 through a suitable passage causing the annular piston 63 to move to the left and to exert a thrust against the braking plates 59, 61 and the annular reaction surface 57 on the reactor ring 49. The thrust thus exerted is yieldingly resisted by the compression springs 53. As the reactor ring 49 yields under the force exerted by the piston 63 the pressure plate 47 moves to the left and progressively releases the clutching plates 42, 44. When the clutch 68 becomes completely disengaged and the planet carrier 24 is free to rotate, the ring gear 23 is rigidly restrained against rotation by the braking plates 59, 61. The clutch 68 remains disengaged and the brake 69 engaged so long as the fluid pressure is maintained against the piston 63.

When it is desired to shift to a direct drive, the pressure within the cylinder is relieved and the compressed plunger springs 67 return the piston 63 to its initial starting position. At the same time the springs 53 urge the reactor ring 49 to the right causing the annular surface 48 of the pressure plate 47 to press against the friction plates 42, 44 and lock the plates in frictional contact with each other. The input shaft 16 is then directly coupled to the output shaft 17.

It should be understood that it is not intended to limit the invention to the herein disclosed details of construction and that the invention may be embodied in such other forms and modifications as are embraced by the scope of the appended claims.

What is claimed is:

1. In a change speed power transmission having a housing; input and output shafts with a common axis of rotation; a planetary gear set including a sun gear connected for rotation with one of said shafts, a ring gear rotatably supported within said housing, and a planet carrier connected for rotation with the other of said shafts; a clutch and brake mechanism comprising: a friction plate clutch operatively interposed between said planet carrier and said ring gear, a friction plate brake axially spaced from said clutch and operatively interposed between said ring gear and said housing, a reactor ring mounted in axially slidable relation to said ring gear and presenting a first annular surface in axially confronting relation to one side of said clutch and a second annular surface in axially confronting relation to one side of said brake, said annular surfaces facing in one axial direction, spring means interposed between said ring gear and said reactor ring for urging said reactor ring in said one axial direction and normally engaging said clutch, and means selectively engaging the other side of said brake to lock said ring gear to said housing and axially move said reactor ring in opposition to said spring means to disengage said clutch.

2. In a change speed power transmission having a housing; input and output shafts with a common axis of rotation; a planetary gear set including a sun gear connected for rotation with one of said shafts, a ring gear rotatably supported within said housing, and a planet carrier connected for rotation with the other of said shafts; a clutch and brake mechanism comprising: a reactor ring axially slidable on said ring gear and presenting first and second axially spaced annular surfaces, a first series of annular friction plates nonrotatably mounted on and axially slidable on said planet carrier, a second series of annular friction plates interleaved between said first series and nonrotatably connected with and axially slidable on said ring gear, said first and second series of friction plates being axially interposed between said first annular surface on said reactor ring and said ring gear, a third series of annular friction plates axially slidable and nonrotatably mounted on said ring gear, a fourth series of friction plates interleaved between said third series, said fourth series of friction plates being nonrotatably connected to and axially slidable on said housing, spring means operatively interposed between said reactor ring and ring gear normally biasing said first and second series of plates into frictional engagement, and thrust transmitting means selectively placing said third and fourth series of friction plates in frictional engagement with each other by urging them against said second annular surface of said reactor ring and axially moving said reactor ring to simultaneously disengage said first and second series of annular plates.

3. In a change speed power transmission having a housing; input and output shafts with a common axis of rotation; a planetary gear set including a sun gear connected for rotation with one of said shafts, a ring gear rotatably supported within said housing, and a planet carrier connected for rotation with the other of said shafts; a clutch and brake mechanism comprising: a first series of friction plates axially slidable on and nonrotatably engaging said planet carrier, a second series of annular friction plates axially slidable on and nonrotatably engaging said ring gear, said second series of friction plates being interleaved between said first series, a third series of annular friction plates axially slidable on and nonrotatably connected to said housing, a fourth series of annular friction plates axially slidable on and nonrotatably connected to said ring gear, a reactor ring axially slidable on and nonrotatably connected with said ring gear, said fourth series of friction plates being interleaved with said third series, said third and fourth series of plates being axially spaced from said first and second series of friction plates, a spring biasing means interposed between said reactor ring and ring gear and axially moving said reactor ring in one direction to urge said first and second series of friction plates into frictional contact, and thrust transmitting means selectively operative to axially move said reactor ring to simultaneously release said first and second series of plates from frictional engagement and to urge said third and fourth series of friction plates into frictional engagement thereby unlocking said planet carrier from said ring gear and locking said ring gear to said housing to transmit power through said planetary gear set at a predetermined speed ratio.

4. In a change speed power transmission having a housing; input and output shafts with a common axis of rotation; a planetary gear set including a sun gear connected for rotation with one of said shafts, a ring gear rotatably supported within said housing, and a planet carrier connected for rotation with the other of said shafts; a clutch and brake mechanism comprising: a reactor ring axially slidable on and nonrotatably connected with said ring gear, a collar nonrotatably mounted on said ring gear, an annular pressure plate rigidly connected to said reactor ring and encircling said splined collar, said annular pressure plate having an annular vertically disposed pressure surface, a first series of friction plates axially slidable on and nonrotatably connected to said collar, a second series of friction plates interleaved between the plates of said first series of plates, said plates being nonrotatably connected with and axially slidable on said planet carrier, a third series of friction plates axially slidable on and nonrotatably mounted within said housing, a fourth series of annular friction plates interleaved between said third series, said fourth series being axially slidable on and nonrotatably connected with said gear, a plurality of compression springs interposed between said ring gear and reactor ring and normally urging said pressure surface against said first and second series of friction plates to lock said ring gear integral in rotation with said planet carrier, and thrust transmitting means selectively operative to urge said third and fourth series of friction plates into frictional engagement in opposition to said springs and axially move said reactor ring and pressure plate to release said first and second series of plates from frictional engagement thereby simultaneously locking said ring gear to said housing and unlocking said planetary carrier from said ring gear.

5. In a change speed power transmission having a housing; input and output shafts with a common axis of rotation; and a planetary gear set including a sun gear connected for rotation with one of said shafts, a ring gear rotatably supported within said housing with first and second externally splined sections, and a planet carrier connected for rotation with the other of said shafts with an external splined section; a clutch and brake mechanism comprising: a first series of annular friction plates centered about said common axis and having internal splines engaging said splined section on said planet carrier, a second series of annular friction plates interleaved between said first series of friction plates and centered about said common axis, said second series having external splines, a collar having internal splines engaging said external splines on said second series of friction plates and said first splined section on said ring gear, a third series of annular friction plates having an internal set of splines and being centered about said common axis and axially spaced of said first and second series of friction plates, said third series of friction plates being splined to said second splined section on said ring gear, a fourth series of annular friction plates interleaved between said third series of friction plates and externally splined to said housing, a reactor ring centered about said common axis and having a portion encircling said collar to limit its axial movement and to present an annular pressure surface confronting said first and second series of friction plates, a plurality of horizontally disposed compression springs interposed between said ring gear and the reactor ring and normally urging said pressure surface against said first and second series of friction plates to hold said friction plates in frictional engagement thereby locking said planet carrier to said ring gear for direct drive, and thrust transmitting means selectively operative to urge said third and fourth series of friction plates into frictional engagement and to simultaneously move said reactor ring axially to release said first and second series from frictional engagement.

6. In a change speed power transmission having a housing with an internal splined section; input and output shafts with a common axis of rotation; and a planetary gear set including a ring gear rotatably supported within said housing with two axially spaced splined sections on its outer periphery, a planet carrier connected for rotation with one of said shafts with a splined section on its periphery, and a sun gear connected for rotation with the other of said shafts; a clutch and brake mechanism comprising: a splined collar engaging the first of said splined sections on the ring gear, a first series of annular friction plates centered about said common axis and having internal splines engaging said splined section on said planet carrier, a second series of annular friction plates interleaved between said first series and having external splines engaging said splined collar, a third series of annular friction plates centered about said common axis and axially spaced from said first and second series, said third series of friction plates having internal splines engaging said second splined section on said ring gear, a fourth series of annular friction plates interleaved between said third series and having external splines engaging said splined section of the said housing, a reactor ring splined to said second splined section on said ring gear and presenting an annular pressure surface to urge said first and second series of friction plates into frictional engagement and an annular reaction surface confronting said third and fourth series of friction plates, spring means interposed between said ring gear and said reactor ring to normally urge said annular pressure surface against said first and second series into frictional engagement and render said planetary carrier integral in rotation with said ring gear to provide a speed ratio of 1 between said input and output shafts, thrust transmitting means axially confronting said third and fourth series of friction plates and selectively operative to lock them into frictional engagement by urging said third and fourth series of plates against said annular reaction surface on said reactor ring and simultaneously move said reactor ring to release said first and second series of friction plates from frictional engagement.

7. In a change speed power transmission having input and output shafts with a common axis of rotation; a housing with an end portion presenting an annular cylinder centered about said common axis; and a planetary gear set including a sun gear connected for rotation with one of said shafts, a ring gear rotatably supported within said housing, and a planet carrier connected for rotation with the other of said shafts; a clutch and brake mechanism comprising: a collar axially slidable on and nonrotatably connected to said ring gear, a first series of annular friction plates centered about said common axis, and axially slidable on and nonrotatably connected to said planet carrier, a second series of annular friction plates interleaved between said first series and axially slidable on and nonrotatably connected to said collar, a reactor ring axially slidable on and nonrotatably mounted on said ring gear, said reactor ring presenting an annular pressure and a reaction surface, said pressure surface confronting said first and second series of friction plates, a third series of annular friction plates centered about said common axis and axially spaced from said first and second series of friction plates, said third series of friction plates being axially slidable and nonrotatably mounted on said ring gear, a fourth series of annular friction plates interleaved between said third series of friction plates, said fourth series of friction plates being axially slidable on and nonrotatably mounted within said housing, spring means interposed between said reactor ring and said ring gear and normally urging said annular pressure surface on said reactor ring against said first and second series of friction plates, an annular piston operatively associated with said annular cylinder and presenting an annular surface confronting said third and fourth series of friction plates to selectively urge said third and fourth series of plates into frictional engagement against said annular reaction surface and move said ring axially in opposition to said spring means to release said annular pressure surface from holding said first and second series of plates in frictional contact, and spring return means for returning said annular piston to its initial position when said piston is not being actuated by fluid pressure.

8. In a change speed power transmission having a housing; input and output shafts with a common axis of rotation; a planetary gear set including a sun gear connected for rotation with one of said shafts, a ring gear rotatably supported within said housing, and a planet carrier connected for rotation with the other of said shafts; a clutch and brake mechanism comprising: a first series of annular friction plates centered about said common axis, said first series of plates being axially slidable on and nonrotatably mounted on said planet carrier, a second series of friction plates interleaved between said first series of plates and axially slidable on and nonrotatably connected to said ring gear, a reactor ring centered about said common axis and having an annular pressure surface actuating said first and second series of plates and an annular reaction surface, said reactor ring being axially slidable on and nonrotatably mounted on said ring gear, a third series of annular friction plates centered about said common axis and axially spaced from said first and second series of plates, said third series of plates being axially slidable on and nonrotatably mounted on said ring gear, a fourth series of annular friction plates interleaved between said third series of plates, and axially slidable on and nonrotatably connected to said housing, spring means interposed between said ring gear and said reactor ring to normally urge said annular pressure surface against said first and second series of plates to hold said first and second series of plates in frictional engagement and thereby render said planet carrier integral in rotation with said ring gear, thrust transmitting means selectively operative to urge said third and fourth series of plates against said annular reaction surface to lock said ring gear integrally with said housing and move said reactor ring axially in relationship to said ring gear to disengage said annular pressure plate from said first and second series of friction plates in order to unlock said planetary carrier from said ring gear.

9. In a change speed power transmission having a housing; input and output shafts with a common axis of rotation; a planetary gear set including a sun gear connected for rotation with one of said shafts, a ring gear rotatably supported within said housing, and a planet carrier connected for rotation with the other of said shafts; a clutch and brake mechanism comprising: a first series of annular friction plates centered about said common axis and axially slidable and nonrotatably mounted on said planet carrier, a second series of annular friction plates interleaved between said first series of plates and axially slidable on and nonrotatably connected to said ring gear, a reactor ring axially slidable on and nonrotatably supported on said ring gear, said reactor ring presenting an annular pressure surface confronting said first and second series of friction plates and an annular reaction surface, a plurality of compression springs horizontally interposed between said reactor ring and said ring gear in thrust transmitting relationship to said annular pressure surface, said reactor ring being so constructed and arranged as to provide receiving cages for said springs, said springs normally urging said annular pressure surface against said first and second series of plates into frictional engagement and thereby rendering said planet carrier integral in rotation with said sun gear to provide a speed ratio of 1, a third series of annular friction plates centered about said common axis and axially spaced from said first and second series of plates, said third series of plates being axially slidable and nonrotatably mounted on said ring gear, a fourth series of annular friction plates interleaved between said third series of friction plates and axially slidable on and nonrotatably connected to said housing, and thrust transmitting means selectively operative to urge said third and fourth series of plates against said annular reaction surface to lock said ring gear integrally with said housing and to move said reactor ring axially in opposition to said springs and thereby release said first and second series of plates from frictional engagement.

10. In a change speed power transmission having a housing; input and output shafts with a common axis of rotation; a planetary gear set including a sun gear connected for rotation with one of said shafts, a ring gear rotatably supported within said housing, and a planet carrier connected for rotation with the other of said shafts; a clutch and brake mechanism comprising: a first series of annular friction plates centered about said common axis, and axially slidable on and nonrotatably supported by said planet carrier, a collar encircling said ring gear and axially slidable on and nonrotatably connected to said ring gear, a second series of annular friction plates interleaved between said first series of plates and axially slidable on and nonrotatably connected to said collar, a reactor ring axially slidable and nonrotatably mounted on said ring gear, said reactor ring presenting an annular reaction surface, a pressure plate presenting an annular pressure surface and rigidly connected to said reactor ring, said pressure plate cooperating with said reactor ring to form a cage about said collar to limit axial movement of said collar, a third series of annular friction plates centered about said common axis and axially spaced from said first and second series of plates, said third series of plates being axially slidable on and nonrotatably supported on said ring gear, a fourth series of annular friction plates interleaved between said third series of plates, said fourth series of plates being axially slidable on and nonrotatably connected to said housing, a plurality of compression springs horizontally interposed between said ring gear and reactor ring and normally urging said reactor ring in one axial direction to bring said annular pressure surface in thrust transmitting relationship to said first and second series of plates and hold them in frictional engagement, and thrust transmitting means selectively operative to urge said third and fourth series of plates against said annular reaction surface in opposition to said springs and said one axial direction and to release said pressure surface from engaging said first and second series of plates thereby simultaneously unlocking said planet carrier and locking said ring gear integrally with said housing to provide for power transmission through said planetary gear set at a predetermined speed ratio.

11. In a change speed power transmission having a housing; input and output shafts with a common axis of rotation; and a planetary gear set operatively interposed between said input and output shafts and including a ring gear element, a sun gear element, and a planet carrier element; a clutch and brake mechanism comprising: a first series of annular friction plates centered about said common axis and axially slidable on and nonrotatably supported by a first of said elements; a second series of annular friction plates axially slidable on and nonrotatably engaging a second of said elements; said second series of friction plates being interleaved between said first series; a reactor ring axially slidable on and nonrotatably connected with said second element; a third series of annular friction plates axially slidable on and nonrotatably connected to said housing; a fourth series of annular friction plates axially slidable on and nonrotatably connected to said second element; said fourth series of friction plates being interleaved with said third series; said third and fourth series of plates being axially spaced from said first and second series of friction plates; a spring biasing means interposed between said reactor ring and said second element and axially moving said reactor ring in one direction to urge said first and second series of friction plates into frictional contact; and thrust transmitting means selectively operative to axially move said reactor ring to simultaneously release said first and second series of plates from frictional engagement and to urge said third and fourth series of friction plates into frictional engagement thereby disengaging said first element from said second element and engaging said second element with said housing to transmit power through the planetary gear set at a predetermined speed ratio.

12. In a change speed planetary transmission having a housing; input and output shafts with a common axis of rotation; and a planetary gear set operatively interposed between said input and output shafts and including a first, second and third element mounted to rotate about said common axis; a clutch and brake mechanism comprising: a first series of annular friction plates centered about said common axis and axially slidable on and nonrotatably supported by a first of said elements; a second series of friction plates interleaved between said first series of plates and axially slidable on and nonrotatably connected to a second of said elements; a reactor ring axially slidable and nonrotatably mounted on said second element; said reactor ring presenting first and second annular reaction surfaces; a third series of annular friction plates centered about said common axis and axially spaced from said first and second series of plates; said third series of plates being axially slidable on and nonrotatably supported on said second element; a fourth series of annular friction plates interleaved between said third series of plates; said fourth series of plates being axially slidable on and nonrotatably connected to said housing; a plurality of compression springs interposed between said second element and said reactor ring and normally urging said reactor ring in one axial direction to bring said first annular pressure surface in thrust transmitting relationship to said first and second series of plates and hold them in frictional engagement; and thrust transmitting means selectively operative to urge said third and fourth series of plates against said second annular reaction surface in opposition to said springs and said one axial direction and release said first pressure surface from engaging said first and second series of plates thereby simultaneously disengaging said first element and engaging said second element integrally with said housing.

13. In a change speed power transmission having a housing; input and output shafts with a common axis of rotation; and a planetary gear set operatively interposed between said input and output shafts and having first, second and third elements mounted to rotate about said common axis; a clutch and brake mechanism comprising: a friction plate clutch operatively interposed between a first said element and a second said element; a friction plate brake axially spaced from said clutch and operatively interposed between said second element and said housing; a reactor ring mounted in axially slidable relation to said third element and presenting a first annular surface in axially confronting relation to one side of said clutch and a second annular surface in axially confronting relation to one side of said brake; said annular surfaces facing in one axial direction; spring means interposed between said second element and said reactor ring urging said reactor ring in one axial direction normally engaging said clutch; and means selectively engaging the other side of said brake to lock said second element to said housing and axially move said reactor ring in opposition to said spring means to disengage said clutch.

14. A clutch and brake mechanism mounted about a common axis for selectively engaging a first element with a second or third element comprising: a friction plate clutch operatively interposed between said first and second elements; a friction plate brake disposed in axially spaced relation from said clutch and operatively interposed between said first and third elements; a reactor member axially slidable on and nonrotatably connected with said first element presenting a first reaction surface confronting one side of said clutch and a second reaction surface confronting one side of said brake; said reaction surfaces facing the same axial direction; a first thrust means interposed between the reactor member and the first element operative to normally engage said clutch; and a second thrust means selectively engaging the other side of said brake to engage said first member with said third member and move the reactor member in opposition to the first thrust means to disengage said clutch.

15. A clutch and brake mechanism mounted about a common axis for selectively engaging a first element with a second or third element comprising: a friction clutch plate axially slidable on and nonrotatably connected with said second element; a friction brake plate disposed in axially spaced relation from said clutch plate and axially slidable on and nonrotatably connected with said third element; a reactor member axially slidable on and nonrotatably connected with said first element presenting a first reaction surface confronting one side of said clutch plate and a second reaction surface confronting one side of said brake plate, said reaction surfaces facing the same axial direction; a reaction surface on said first member confronting the other side of the clutch plate; a biasing means interposed between said reacting member and said first element operative to normally engage said clutch plate to engage said first member with said second member; and a thrust means selectively engaging the other side of said brake plate to engage said first member with said third member and move the reactor member in opposition to the biasing means to disengage said clutch.

References Cited in the file of this patent

UNITED STATES PATENTS

| | | |
|---|---|---|
| 1,297,094 | Carr | Mar. 11, 1919 |
| 2,221,014 | Williamson | Nov. 12, 1940 |
| 2,472,559 | Arnold et al. | June 7, 1949 |
| 2,540,965 | Schellinger | Feb. 6, 1951 |